Aug. 28, 1962 MOTOSUKE TAKEDA 3,050,884
CLAMP FOR PRESSING TROUSERS
Filed Aug. 5, 1959 2 Sheets-Sheet 1
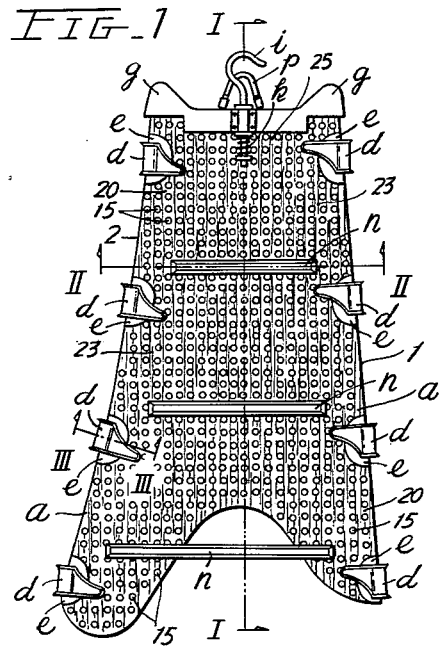
INVENTOR
Motosuke Takeda
BY
ATTORNEY Aug. 28, 1962  MOTOSUKE TAKEDA  3,050,884
CLAMP FOR PRESSING TROUSERS
Filed Aug. 5, 1959  2 Sheets-Sheet 2
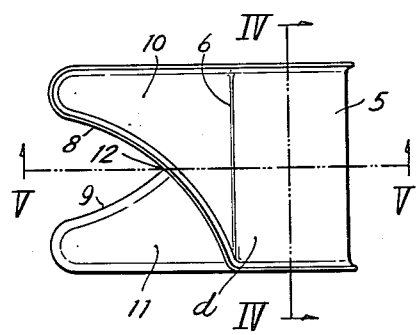
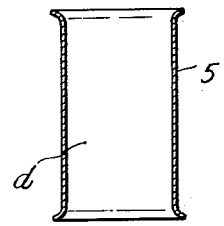
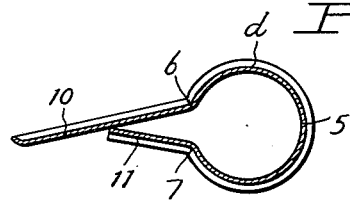
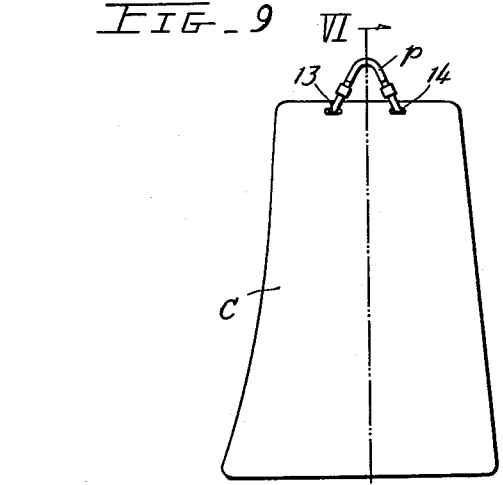
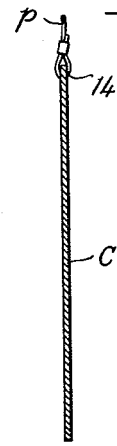
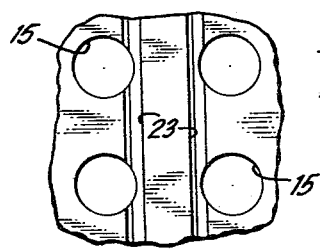
INVENTOR
Motosuke Takeda
BY
Michael S. Striker
ATTORNEY 3,050,884
CLAMP FOR PRESSING TROUSERS
Motosuke Takeda, 19 Minamikagaya-machi,
Sumiyoshi-ku, Osaka, Japan
Filed Aug. 5, 1959, Ser. No. 831,779
4 Claims. (Cl. 38—71)

This invention relates to a clamp for pressing trousers.
In the accompanying drawings wherein an embodiment of this invention is shown:
FIG. 1 is a plan view;
FIG. 2 is a view showing the opposite side or bottom of this device;
FIGS. 3, 4 and 5 are cross sections along the lines I—I, II—II and III—III, respectively, of FIG. 1;
FIG. 6 is a plan view of a clip;
FIGS. 7 and 8 are cross sections along the lines IV—IV and V—V, respectively, of FIG. 6;
FIG. 9 is a plan view of a crease forming plate; and
FIG. 10 is a cross section along the line VI—VI of FIG. 9; and
FIG. 11 is a greatly enlarged fragmentary elevational view of a portion of the structure shown in FIG. 1.

Description will now be made with reference to an embodiment of this invention as shown in the drawings.

In FIGS. 1 to 5, (a) and (b) represent upper and lower flat clamping boards which are made of wood, veneer and the like. When the leg parts of a pair of trousers are to be put between said clamping boards (a) (b), a crease forming plate (c) made of synthetic resin and the like is inserted between the inner sides of the legs of the trousers, and both side edges 1 2 3 4 of the clamping boards (a) (b) are clamped together by means of a plurality of clips (d) (d) which are clipped on symmetrically. To the top edge of said plate (c) are attached the ends 13 14 of a cord (p) which is suspended on a suspension hook. The clips (d) (d) comprise flat spring steel plates which are bent into a superior arc or bent part 5 and to both ends 6 7 of said bent part 5 are provided triangular or substantially triangular clamping extensions 10 11, respectively, which have inclining edges 8 9 opposing each other and which cross each other at an intersecting point 12.

To the parts of the upper and lower clamping boards (a) (b) where the clips (d) (d) are clipped are pasted on flat, hard slip members (e) (e), (f) (f) made of melamine resin, silicone resin, phenol resin, metal and the like. Not only do these slip members make sliding easy when the clips are to be clipped on but also they prevent the edges of the boards (a) (b) from being damaged by the clips. Furthermore, when the width of these slip members is made to be shorter than that of the clips, a space will be formed between the clamping extensions 10 11 of the clips (d) (d) and the boards (a) (b) and the compressive force of the clips (d) (d) will be exerted on the crease part of the trousers and thereby crease the trousers with great effect.

The upper and lower flat clamping boards (a) (b) are made of wood or veneer having a shape somewhat larger than the length and width of the leg parts of trousers, and their respective side edges 1 3 are straight and their opposite side edges 2 4 are slightly curved. These clamping boards (a) (b) are provided with a plurality of air vents 15 15, 16 16, respectively. As the edges 17 17, 18 18 of the air vents 15 15, 16 16 communicate with the grooves 23 24 of the board surfaces 19 20 21 22, moisture is led to said air vents 15 15, 16 16 via said grooves 23 24. As shown in FIG. 11, the side edges of the grooves 23 merge with the side edges of the air vents 15 to permit communication therebetween. The arrangement of the grooves 24 and the air vents 16 is analogous.

A coating material such as lacquer, varnish, and the like is applied to the surfaces of the boards, leaving only the above grooves alone. The bottoms 27 28 of the wood or veneer supporting members (g) (h) are pasted onto the upper edges 25 26, respectively, of the clamping boards (a) (b), and through the center of these supporting members are passed suspension hooks (i) (j) having springs (k) (l). On the lower supporting member (h) there are provided stoppers (m) (m).

A plurality of crosspieces (n) (o) are arranged on the outer surfaces 20 22 of the clamping boards (a) (b) to prevent these boards from warping.

According to the present device, both leg parts of a pair of trousers (not shown) are put between the flat clamping boards (a) (b), the plate (c) is inserted between the inner sides of both legs of the trousers, and the clips (d) (d) are clamped onto the edges of the said boards at fixed positions. The trousers are firmly clamped between the flat clamping boards and the plate (c), thereby taking wrinkles out of the trousers and at the same time creasing them.

When water is sprayed on the trousers, the moisture during the time the trousers are clamped passes along the grooves of the clamping boards and to the air vents from where said moisture is dispersed to the outside and thereby promote drying. With the provision of the hard slip members on the side edges of the clamping boards, the clips can be applied smoothly, and at the same time these slip members prevent the edges of the clamping boards where the clips are clamped on from being damaged.

Thus, this clamp is very useful in that it eliminates the need of ironing trousers and it takes wrinkles out very easily.

What I claim is:

1. Apparatus for pressing a pair of trousers comprising, in combination, a pair of substantially flat clamping boards having a size and shape substantially that of said pair of trousers, said clamping boards being adapted to cover a pair of trousers placed therebetween, each of said clamping boards having opposite side surfaces with a plurality of grooves formed in said opposite side surfaces and with a plurality of air holes formed therethrough, each of said air holes communicating with grooves in the opposite side surfaces of said clamping boards; a substantially flat crease board having a size and shape substantially that of said clamping boards, said crease board being adapted to be positioned between the legs of a pair of trousers placed between said clamping boards; and clamping means for clamping said clamping boards together with a pair of trousers and said crease board positioned between the legs of said pair of trousers placed between the said clamping boards in a manner whereby the said pair of trousers is pressed by the said clamping boards and the said crease board.

2. Apparatus for pressing a pair of trousers comprising, in combination, a pair of substantially flat clamping boards having a size and shape substantially that of said pair of trousers, said clamping boards being adapted to cover a pair of trousers placed therebetween, each of said clamping boards having opposite side surfaces with a plurality of grooves formed in said opposite side surfaces and with a plurality of air holes formed therethrough, each of said air holes communicating with grooves in the opposite side surfaces of said clamping boards; a plurality of spaced slip plates affixed to one of said side surfaces of each of said clamping boards at selected positions adjacent the edges thereof, each of said slip plates comprising a flat plate of substantially hard material; a substantially flat crease board having a size and shape substantially that of said clamping boards, said crease board being adapted to be positioned between the legs of a pair of trousers placed between said clamping boards; and clamping means for clamping said clamping boards together with a pair of trousers and said crease board positioned between the legs of said pair of trousers placed between the said clamping boards in a manner whereby the said pair of trousers is pressed by the said clamping boards and the said crease board, said clamping means comprising a plurality of clips each adapted to slip over a pair of opposing slip plates of said clamping boards to clamp the said clamping boards together.

3. Apparatus for pressing a pair of trousers comprising, in combination, a pair of substantially flat clamping boards having a size and shape substantially that of said pair of trousers, said clamping boards being adapted to cover a pair of trousers placed therebetween, each of said clamping boards having opposite side surfaces with a plurality of grooves formed in said opposite side surfaces and with a plurality of air holes formed therethrough, each of said air holes communicating with grooves in the opposite side surfaces of said clamping boards; a plurality of spaced slip plates affixed to one of said side surfaces of each of said clamping boards at selected positions adjacent the edges thereof, each of said slip plates comprising a flat plate of substantially hard material; a substantially flat crease board having a size and shape substantially that of said clamping boards, said crease board being adapted to be positioned between the legs of a pair of trousers placed between said clamping boards; and clamping means for clamping said clamping boards together with a pair of trousers and said crease board positioned between the legs of said pair of trousers placed between the said clamping boards in a manner whereby the said pair of trousers is pressed by the said clamping boards and the said crease board, said clamping means comprising a plurality of clips each adapted to slip over a pair of opposing slip plates of said clamping boards to clamp the said clamping boards together, each of said clips comprising a flat spring steel member bent in substantially U-shape to form two arms, each of said arms having an end edge which is inclined at an opposite slope to the end edge of the other of said arms.

4. Apparatus for pressing a pair of trousers comprising, in combination, a pair of substantially flat clamping boards having a size and shape substantially that of said pair of trousers, said clamping boards being adapted to cover a pair of trousers placed therebetween, each of said clamping boards having opposite side surfaces with a plurality of grooves formed in said opposite side surfaces and with a plurality of air holes formed therethrough, each of said air holes communicating with grooves in the opposite side surfaces of said clamping boards; a plurality of spaced slip plates affixed to one of said side surfaces of each of said clamping boards at selected positions adjacent the edges thereof, each of said slip plates comprising a flat plate of substantially hard material; a substantially flat crease board of synthetic resin material having a size and shape substantially that of said clamping boards, said crease board being adapted to be positioned between the legs of a pair of trousers placed between said clamping boards; and clamping means for clamping said clamping boards together with a pair of trousers and said crease board positioned between the legs of said pair of trousers placed between the said clamping boards in a manner whereby the said pair of trousers is pressed by the said clamping boards and the said crease board, said clamping means comprising a plurality of clips each adapted to slip over a pair of opposing slip plates of said clamping boards to clamp the said clamping boards together.

References Cited in the file of this patent

UNITED STATES PATENTS

| | | |
|---|---|---|
| 626,391 | McLane | June 6, 1899 |
| 1,070,683 | Hale | Aug. 19, 1913 |
| 1,192,384 | Brya | July 25, 1916 |
| 1,215,655 | Herr | Feb. 13, 1917 |
| 1,309,189 | Davis | July 8, 1919 |
| 1,402,049 | Byer | Jan. 3, 1922 |
| 1,452,095 | Reizenstein | Apr. 17, 1923 |
| 1,621,116 | Lance | Mar. 15, 1927 |